United States Patent
Spivak et al.

(10) Patent No.: US 8,347,321 B1
(45) Date of Patent: Jan. 1, 2013

(54) IN PLACE OBJECT RECONSTRUCTION

(75) Inventors: Victor Spivak, San Mateo, CA (US);
Meir Amiel, Pleasanton, CA (US);
David Buccola, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 1049 days.

(21) Appl. No.: 11/430,353

(22) Filed: May 8, 2006

Related U.S. Application Data (60) Provisional application No. 60/787,358, filed on Mar. 30, 2006.

(51) Int. Cl.
*G06G 3/00* (2006.01)
(52) U.S. Cl. ........................................ 719/328
(58) Field of Classification Search ............ 726/12; 717/168–173; 719/328
See application file for complete search history.

(56) References Cited

U.S. PATENT DOCUMENTS

| | | | |
|---|---|---|---|
| 5,903,725 A * | 5/1999 | Colyer | 709/203 |
| 6,182,155 B1 * | 1/2001 | Cheng et al. | 719/315 |
| 6,199,203 B1 * | 3/2001 | Saboff | 717/168 |
| 6,360,358 B1 * | 3/2002 | Elsbree et al. | 717/120 |
| 2002/0053020 A1 * | 5/2002 | Teijido et al. | 713/153 |
| 2004/0216133 A1 * | 10/2004 | Roush | 719/316 |
| 2005/0278726 A1 * | 12/2005 | Cano et al. | 719/315 |
| 2006/0195820 A1 * | 8/2006 | Curtis et al. | 717/120 |
| 2006/0195851 A1 * | 8/2006 | Curtis et al. | 719/328 |
| 2007/0209043 A1 * | 9/2007 | Hare et al. | 719/330 |

* cited by examiner

*Primary Examiner* — H. S. Sough
*Assistant Examiner* — Carina Yun
(74) *Attorney, Agent, or Firm* — Van Pelt, Yi & James LLP (57) ABSTRACT

Updating an implementation object is disclosed. A proxy is configured to provide access to a first implementation object that is used to manage an item of content included in a collection of managed content. The first implementation object is replaced with a second implementation object. The proxy is associated with the second implementation object.

12 Claims, 7 Drawing Sheets

IN PLACE OBJECT RECONSTRUCTION

CROSS REFERENCE TO OTHER APPLICATIONS

This application claims priority to U.S. Provisional Patent Application No. 60/787,358 entitled IN PLACE OBJECT RECONSTRUCTION filed Mar. 30, 2006 which is incorporated herein by reference for all purposes.

BACKGROUND OF THE INVENTION

Content management systems are used to organize, manipulate, and archive collections of content for organizations. In some cases, a content management system is developed in part by a customer. A content management system vendor provides general or underlying platforms, services, and/or objects referred to as a base product. The customer, or a developer hired by the customer, defines and develops products (e.g., custom applications, custom data structures, etc.) that run on or otherwise interact with the base product provided by a content management system vendor. The product(s) developed by a customer and the base product collectively form a content management system.

In some content management systems, a content item is represented within a body of managed content by one or more persistent software objects, sometimes referred to herein as "implementation objects". The implementation objects include metadata about and/or other attribute data associated with the content item, and in some cases its relationship to other content, and/or properties or methods available to be performed with respect to the content item, such as check-in, check-out, save, versioning, etc. However, the need may arise to modify the set of behaviors or attributes associated with an implementation object, such as by adding new attributes and/or behaviors and/or modifying existing attributes and/or behaviors. In some content management systems, the behaviors and attributes of an implementation object could only be changed by replacing the original implementation object with a new object that includes the modified attributes and/or behaviors. However, replacing the implementation object with a new object in a typical system would require a mechanism to inform any applications and/or other users using the original implementation object of the change, and could result in a loss of access to the content or other error if the application were not configured to understand and respond properly to such a notification. It would be convenient therefore to have content management systems that support modification of a set of attributes in seamless or otherwise transparent manner (for example) without requiring the creation of new functionality to report and/or detect when attributes, methods, or properties have changed, or requiring a user or process using an implementation object to "re-fetch" every time the implementation object is updated.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Updating an implementation object is disclosed. A proxy or other user handle is configured to provide access to a first implementation object. The first implementation object is used to manage an item of content included in a collection of managed content. In some embodiments, the item of content includes, is used to populate, or is otherwise associated with one or more documents. The first implementation object is replaced with a second implementation object. In some embodiments, the second implementation object is associated with a second set of attributes and/or methods whereas the first implementation object is associated with a first set of attributes and/or methods. The proxy is associated with the second implementation object. In some embodiments, this enables an application or other user of the implementation object to continue to use the same reference to access the implementation object before and after update of the implementation object. In some embodiments a second proxy is configured to provide access to the second implementation object. In some embodiments, a second proxy is configured only if the second (updated) implementation object includes one or more new interfaces required to be exposed (e.g., by an application, process, or service that caused the implementation object to be updated), since such new interfaces would not be exposed by the original proxy. In some embodiments, the second proxy is returned in response to a fetch request received after the first implementation object is replaced. The first proxy remains active and is bound to the second implementation object, such that proper calls via the first proxy to methods of the implementation object will succeed so long as the underlying method was not removed or modified in a way that makes it not accessible via the interface(s) exposed by the original proxy.

Figure 1:
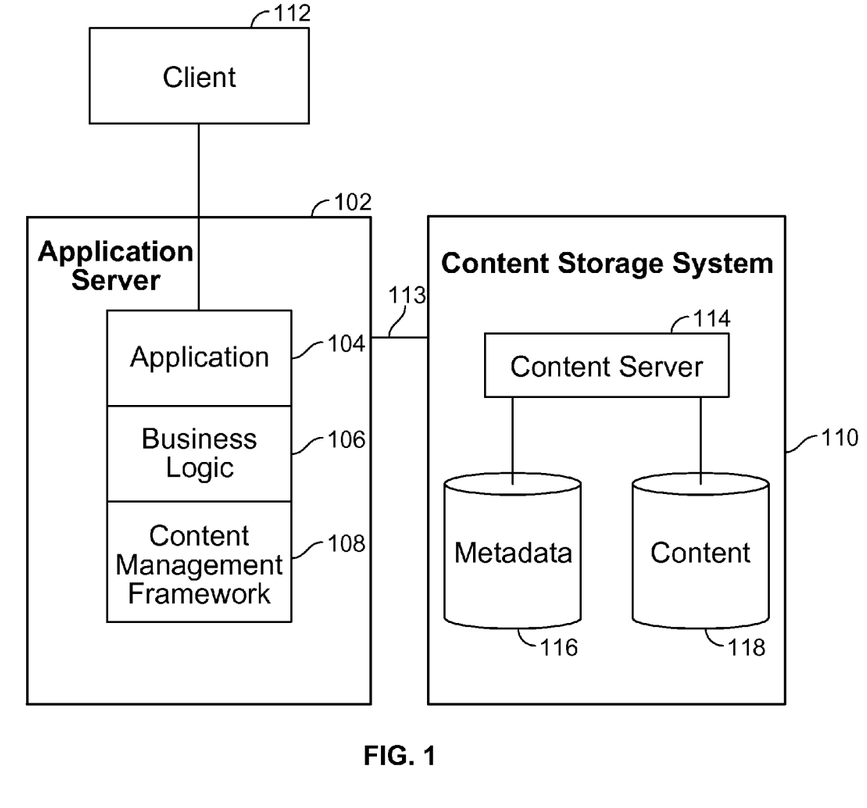
FIG. 1 is a block diagram illustrating an embodiment of a content management system.

FIG. 1 is a block diagram illustrating an embodiment of a content management system. In the example shown, content storage system 110 stores items of content associated with one or more documents. Access to and manipulation of content items stored on content storage system 110 is provided through application server 102. In some embodiments, application server 102 and content storage system 110 comprise a single physical system. In some embodiments, application server 102, content storage system 110, or both is/are implemented using two or more physical systems.

Application 104 is configured to interact with and use business logic 106 running on content management framework 108 to manage one or more items of content stored on content storage system 110. In some embodiments, content management framework 108 includes a set of foundation classes of objects used to represent and provide content management services with respect to items of content stored on content storage system 110. Business logic 106 in some embodiments is implemented at least in part as a business object framework, including logic and/or methods that instantiate, populate, and otherwise use objects associated with the content management framework. In some embodiments, application 104 interacts with business logic 106 via a published or other API to ingest and store items of content in content storage system 110 and to provide managed access to and control over items of content stored in content storage system 110.

In some embodiments, application server 102 includes a Java Virtual Machine (JVM). In such systems, some portion of application 104, business logic 106, and/or content management framework 108 are implemented in Java and run on the JVM. In some embodiments, other technologies besides Java are used to implement some or all components of application server 102. Examples of other technologies include other object oriented languages such as C++.

Client 112 is configured in this example to access application server 102 (e.g., via a network) to create and/or otherwise provide new content; search for, retrieve, or otherwise access content managed by and/or otherwise associated with application server 102; and/or obtain other content management related services with respect to content managed by application server 102.

Content storage system 110 includes content server 114 configured to send/receive content via communication interface 113. In some embodiments, application server 102 and content storage system 110 are implemented as two or more physical systems and communication interface 113 comprises a network connection. Content server 114 provides access to content associated with and/or stores new content in content storage 118. In some embodiments, content storage 118 includes content addressed storage and/or other external content storage system, such as an EMC Centera™ system available commercially from EMC Corporation. The content server 114 stores in and/or accesses from metadata storage 116 metadata derived from and/or otherwise associated with items of content stored in content storage 118. In some embodiments, metadata storage 116 includes one or more database applications and/or systems, such as an Oracle™ database. In various embodiments, the metadata stored in metadata storage 116 includes one or more document and/or content objects representing and/or otherwise associated with items of managed content stored in content storage 118, and/or one or more full text indexes and/or associated entries associated with content stored in content storage 118. In various embodiments, metadata stored in metadata storage 116 is used to track and/or provide access to successive versions of an item of content, such as a file or other item of content, and/or to provide other content management functionality.

In some embodiments, implementation classes are deployed in repository (e.g., content storage system 110) and downloaded to content management framework 108. Upon initial configuration and startup of application server 102, one or more class loaders are instantiated and used to download foundation implementation classes from the repository. Once downloaded to content management framework 108, in various embodiments application code comprising application 104, logic (e.g., services) comprising business logic 106, or both are used as required, e.g., to store a new (or new version of a) document or other content, to instantiate an object, populate object attributes, and associate the object with the content it represents. Once instantiated, populated, and associated with content, the implementation object is stored persistently in the repository and available to be accessed and used at runtime as a runtime instance on application server 102, e.g., to allow application code and/or business logic to invoke methods of the implementation object as required to access, use, store, and otherwise manage the associated content.

Figure 2:
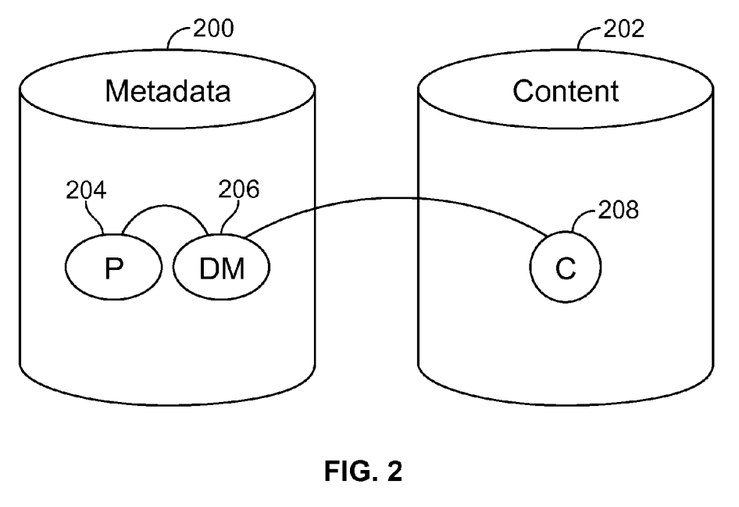
FIG. 2 is a block diagram illustrating an embodiment of an item of content and associated metadata in content storage and metadata storage, respectively.

FIG. 2 is a block diagram illustrating an embodiment of an item of content and associated metadata in content storage and metadata storage, respectively. In the example shown, content item 208 may be a file, a file system object, a database table, a database file, or such. If, for example, content item 208 is used in a car catalog, content item 208 includes a picture of a car, a description of car features, etc. Content item 208 may comprise a single item or type of content or may comprise multiple items/types of content.

Dynamic proxy 204 on metadata storage 200 is associated with content item 208. Dynamic proxy 204 is an interface, wrapper, link, access mechanism, user handle, or other reference that exposes the interface(s) of document object 206. A call or invocation input to dynamic proxy 204 is passed to document object 206; attributes or behaviors associated with managing content item 208 are primarily included or implemented in document object 206. In some embodiments, a relatively small amount of logic or processing is included in dynamic proxy 204. For example, error or exception handling can be performed by dynamic proxy 204 before a call is passed to document object 206.

Document object 206 is an implementation object or system object that includes a set of attributes, behaviors, methods, or other properties associated with management of content item 208 including saving, searching, accessing, formatting, modifying, etc. Rules, parameters, or other attributes are included in a document object in various embodiments. A document object inherits or otherwise obtains its attributes from a base document class and any custom class(es) assigned to the document object. A custom class may add a particular set of attributes or behaviors. For example, if document object 206 is associated with a Spanish car catalog, the base document class assigns general behaviors or properties associated with documents (e.g., general functionality such as saving, retrieving, searching, querying, etc.), a "car catalog" class assigns car catalog related attributes or behaviors, and a "Spanish" class assigns attributes or behaviors related to Spanish language documents.

A user or process that desires access to content management functionality provided by a document object does so via dynamic proxy 204. To ensure that a dynamic proxy is used, dynamic proxy 204 (rather than document object 206) is returned to "instantiate document object" calls or invocations, "fetch document object" calls, etc. Access to the content management functionality provided by a document object then occurs via the returned dynamic proxy. In some embodiments, an error or exception may be returned to a process that attempts to access document object 206 directly.

In various embodiments, one or more items of content (such as content item 108) and associated metadata (such as dynamic proxy 204 and document object 206) can be organized and stored in a variety of ways. In some embodiments, there are multiple dynamic proxies and/or multiple document objects maintained in content storage. For example, a metadata storage contains two dynamic proxies, each of which is associated with a corresponding document object. In some embodiments, intermediary objects associated with a subset of content items are used. An intermediary object is associated with a document object and is used to manage a subset of content items for that document object. Alternatively, in some embodiments multiple items of content are directly associated with and managed by a single document object. In some embodiments, a given item of content is associated with multiple document objects. For example, an item of content may exist as a file or other data structure in content storage and may be later attached and/or otherwise incorporated into another document, such as by attaching it to an email message or importing or otherwise incorporating it wholly into a subsequent word processing or other document.

Replacing an implementation object in place to add/remove/modify one or more attributes and/or methods of the implementation object in a manner transparent to an application and/or other user of the original implementation object is disclosed. As noted above, at times the need arises to associate new and/or different attributes (e.g., metadata) and/or behaviors with a content item. In some cases, the status of a content item with which an implementation object is associated may change in a way that requires additional/different attributes and/or methods be included in the implementation object. Examples of such a status change include arrival at a certain point in a lifecycle of the associated content; the content being promoted to a particular point in a business or other process or workflow; or an action or other input by a user (e.g., individual, application, filtering/routing process, etc.) with respect to the content, such as placing it in a logical storage location, e.g., a folder, that results in a need to associate additional/different attributes and/or methods with the content. In one example, a patient at a hospital becomes combative. The implementation object associated with the patient's medical record is updated so a combative patient flag is rendered with the displayed medical record, written instructions for restraints/sedatives are generated and transmitted to the nursing staff, or other appropriate procedures for a combative patient are applied. Setting the flag to the "combative" value in this example initiates automated processing that causes a psychological consultation and a social worker visit to be scheduled, associated patient history and other forms being generated and associated with the patient's record, a workflow processing being initiated to promote the patient record through the various steps of the psychological and social worker consultations. If the original patient record implementation object did not support the additional attributes and methods required to support the psychological and social worker consultations, including by managing associated content, a need would arise in some content management systems to replace the original implementation object with one that includes the additional attributes and/or methods.

Figure 3:
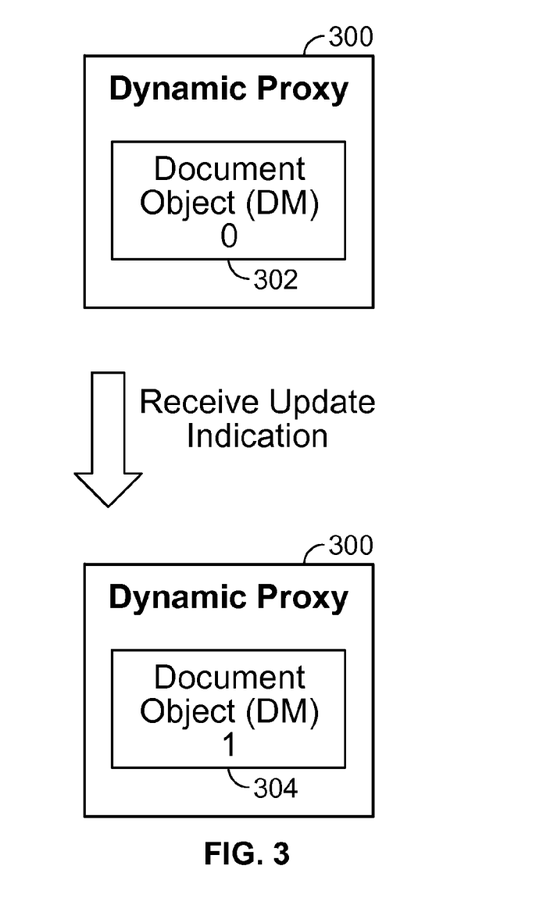
FIG. 3 is a diagram illustrating an embodiment of replacing a document object with a new document object.

FIG. 3 is a diagram illustrating an embodiment of replacing a document object with a new document object. In the example shown, dynamic proxy 300 is a wrapper or reference that exposes interfaces associated with document object 302. Calls or other invocations input to dynamic proxy 300 (e.g., to use content management functionality to manage an item of content) are passed to document object 302. The illustration of dynamic proxy 300 as encapsulating document object 302 is a conceptual relationship. Dynamic proxy 300 and document object 302 can be separate files or other data structure associated by some reference or link.

An indication to update document object 302 is received. In various embodiments, an update indication may be triggered explicitly or implicitly. Examples of an explicit indication include a user input requesting an action that requires a new implementation object to be able to be provided. Examples of an implicit indication include promoting a content item to a next step in a business process or workflow, linking a content item to a folder having associated with it a process or requirement that requires a new implementation object to provide, arrival of a point in the lifecycle of the content item, etc. The update may be the addition, deletion, or modification of a property, behavior, or other attribute regarding access, modification, or other management service associated with an item of content. New document object 304 replaces document object 302 and includes a new set of attributes or behaviors. An appropriate generation procedure or mechanism is used to obtain new document object 304. Dynamic proxy 300 is maintained and is associated with new document object 304. A user or process is able to use dynamic proxy 300 even after document object 302 is replaced with new document object 304. In some embodiments, maintaining dynamic proxy 300 and binding it to new document object 304 avoids the need for a user or process to "re-fetch" a new representation each time a set of attributes is updated.

Figure 4:
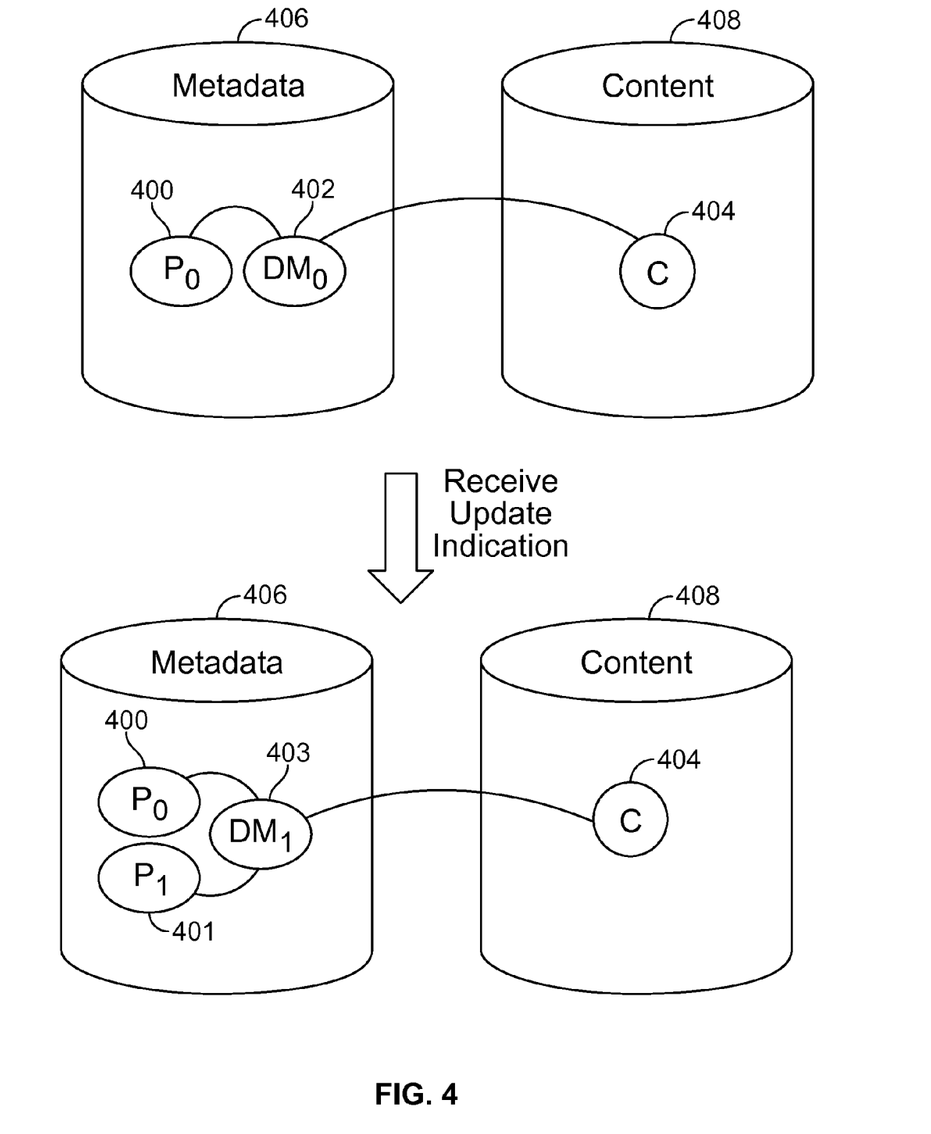
FIG. 4 is a diagram illustrating an embodiment of multiple dynamic proxies associated with a single document object.

FIG. 4 is a diagram illustrating an embodiment of multiple dynamic proxies associated with a single document object. In the example shown, document object 402 is replaced with new document object 403. New document object 403 has a new set of behaviors or attributes associated with accessing or otherwise managing content item 404. For example, a new policy to retain, render, or associate content item 404 is applied.

With two or more dynamic proxies associated with the same document object, seamless and/or continued usage of a prior dynamic proxy is enabled. This is convenient if, for example, a user or a process had "fetched" or otherwise requested access to content management functionality regarding content item 404 through a content management system. A user or a process is able to continue using dynamic proxy 400 even after document object 402 is replaced with new document object 403 without "re-fetching."

New dynamic proxy 401 is associated with new document object 403 and via new dynamic proxy 401 a process, client or other user accesses and/or manipulates content item 404. In response to requests to access to content object 404 (or content management functionality to do so) received after the update indication, new dynamic proxy 401 is returned. In this example, only users with possession of prior dynamic proxy 400 prior to an update are able to use prior dynamic proxy 400 after the update. In some embodiments, if users of prior dynamic proxy 400 were to perform a "re-fetch" or equivalent command, new dynamic proxy 401 would be returned.

In some embodiments, a procedure or other mechanism provided by an underlying environment or other platform manages and performs removal of prior dynamic proxy 400. In a Java environment, a "garbage collection" process may be used to remove prior dynamic proxy 400 at an appropriate time, for example when prior dynamic proxy 400 is no longer being used by a user or process that retained it from a time prior to an update. Corresponding techniques in other platforms can be used to manage and perform removal of prior dynamic proxy 400.

Generation of a new dynamic proxy can be performed in a variety of ways. The design considerations, implementation, or constraints of the particular content management system can be used to select an appropriate technique. In some cases, a simple technique is desired. For example, a new dynamic proxy is always created when an update indication is received. Regardless of whether or not a new document object and a prior document object expose the same interface, a new dynamic proxy is always created. This is desirable in some scenarios because no mechanism is required to evaluate the difference in exposed interfaces between document objects. In other embodiments, this evaluation is performed. If the process determines there is a difference in the interfaces exposed by a prior and a new document object, a new dynamic proxy is created. Otherwise, a new dynamic proxy is not created. This is desirable in scenarios where the exposed interface typically does not change.

Figure 5:
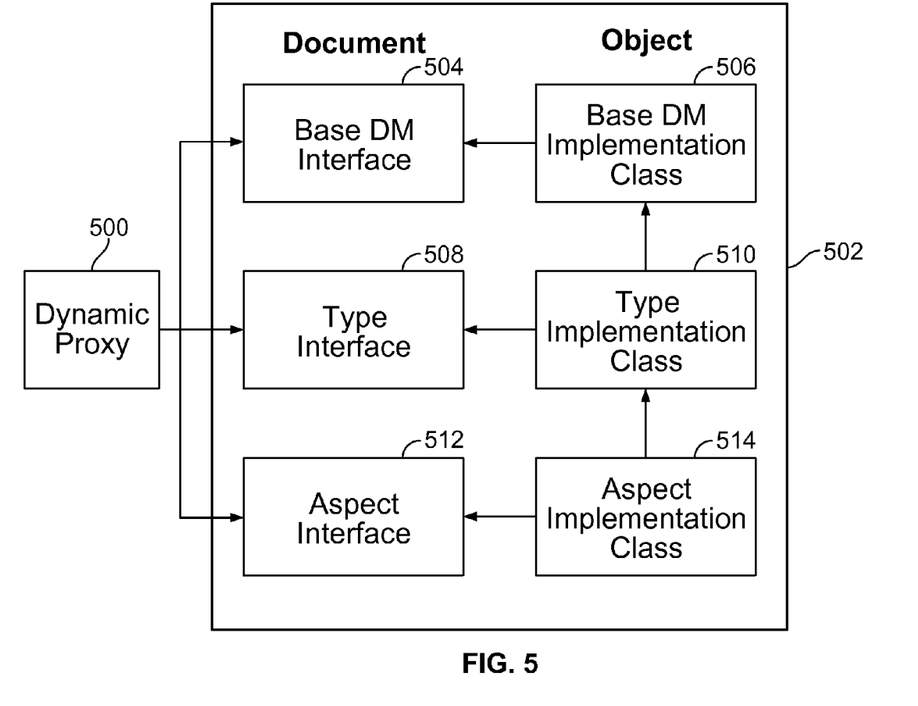
FIG. 5 is a diagram illustrating an embodiment of components of a document object.

FIG. 5 is a diagram illustrating an embodiment of components of a document object. In the example shown, a set of behaviors or other attributes associated with accessing and/or managing one or more items of content in a content repository are accessed via dynamic proxy 500. Document object 502 comprises base components of a base document implementation class, additional/modified attributes/methods determined by the type of content being represented by document object 502, and further additional/modified attributes and/or behaviors that are not determined by and/or specific to the content type. In the example shown, the base components, type-based components, and non-type behaviors, referred to as "aspects", each is associated with an interface that enables, e.g., an application or other user to access the attributes and/or methods with which the interface is associated. Each interface describes the interface exposed by an associated implementation class. In some embodiments, an interface is provided with an implementation class by a creating entity, such as a content management system provider that provides general document functionality and/or structures or a customer that creates a custom class for a specific type of document. In some embodiments, an interface is extracted or otherwise obtained from its associated implementation class.

The components of document object 502 have a hierarchical relationship with each other. Base document implementation class 506 is the parent of type implementation class 510, which in turn is the parent of aspect implementation class 514. Behaviors or attributes are inherited based on hierarchy. Type implementation class 510 and aspect implementation class 514 are custom classes, defined and created by a customer of a content management system provider. A child inherits, runs on, or otherwise leverages the behaviors or attributes of its parent. Dynamic proxy 500 exposes base document interface 504, type interface 508, and aspect interface 512 collectively. Dynamic proxy 500 is generated by referencing or extracting information from interfaces 504, 508, and 512.

Base document interface 504 and implementation class 506 are associated with fundamental or general behaviors or attributes associated with documents in general. This interface and implementation class is able to be used in variety of document objects associated with different types of documents. For example, base document interface 504 and implementation class 506 is used to manage content associated with a patient medial record and a loan application. Some examples of the set of behaviors, attributes, or properties supported in base document implementation class 506 include methods or parameters for accessing, modifying, searching, saving, or exporting one or more associated items of content.

Additional behavior or attributes that are specific to particular type of document or scenario are added by assignment of a type. For example, one type may be associated with medical documents while another type is associated with financial services documents. The assignment of a type to a document object is optional and therefore although document object 502 includes type interface 508 and implementation class 510, this is not required. In this example, at most one type is permitted to be assigned to a document object and is assigned at instantiation.

Types enable a consistent set of behaviors/attributes to be assigned to multiple documents of the same type. However, it is desirable to have some degree of flexibility and allow certain document objects, within and/or across types, to have a different set of behaviors or attributes compared to other document objects of the same type. Aspect interface 512 and implementation class 514 are associated with a particular set of behaviors or attributes. Depending on how the aspect is defined, the set of behaviors or attributes associated with interface 512 and implementation class 514 may supplement those associated with a type or a base document and do not supersede or otherwise overlap with them, or they may instead supersede and/or modify them.

In this example, an aspect is permitted to be assigned at any time. For example, a document object is instantiated using a base document and type. Some time afterwards, a first aspect is added to the document object, e.g., one configured to enforce a seven year retention period with respect to the content, e.g., in response to the content item being linked to a folder configured to apply the retention aspect, and some time after that a second aspect, e.g., one that automatically generates an html rendition each time the item is saved, is added, e.g., because an indication has been received that the content item has been incorporated into a dynamic webpage. An addition, deletion or other modification with respect to an aspect triggers an update so that document object 502 is regenerated and/other otherwise replaced to reflect a new set of behaviors or attributes. Dynamic proxy 500 can still be used and references or is otherwise associated with the new document object.

Figure 6:
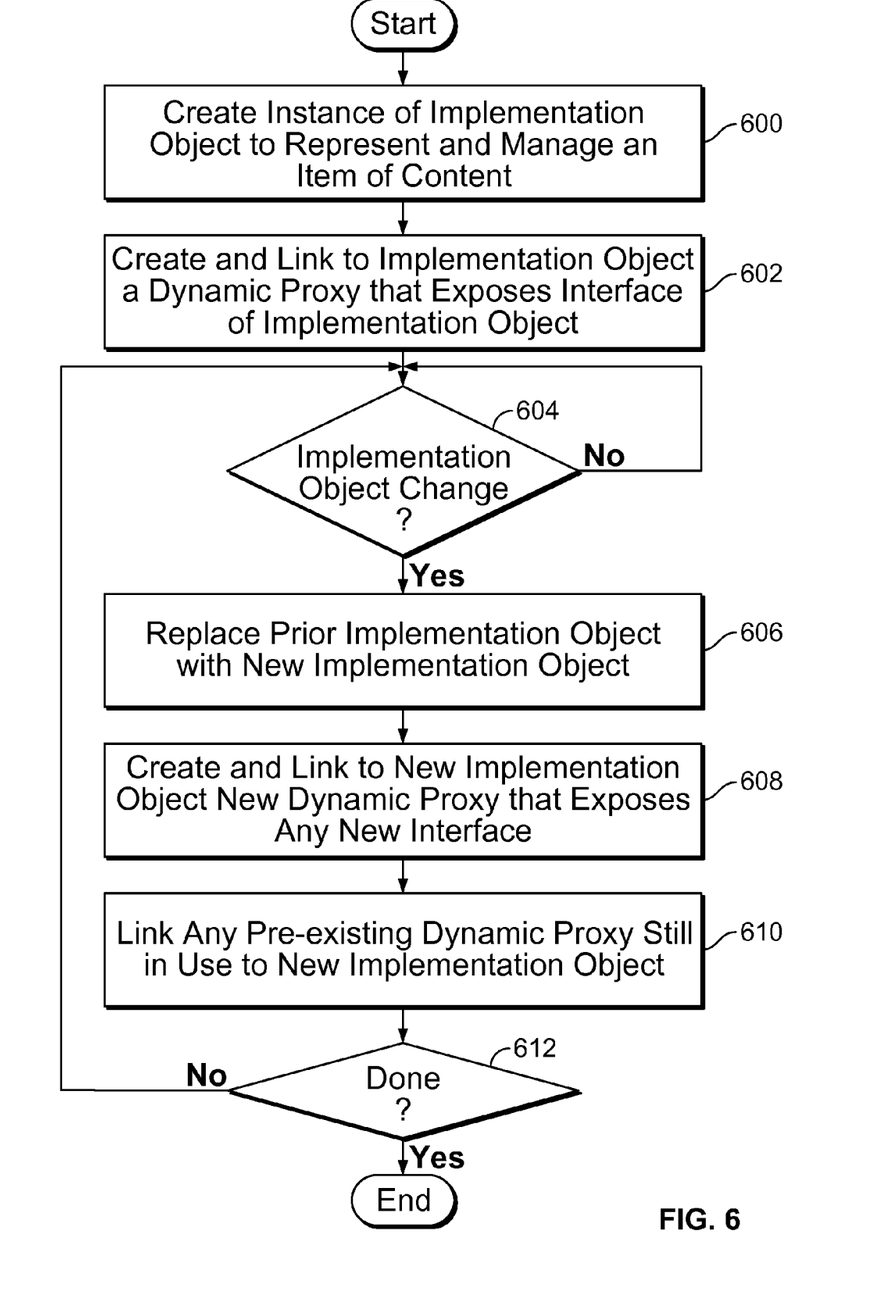
FIG. 6 is a flowchart illustrating an embodiment of a process of managing one or more dynamic proxies and one or more associated document objects.

FIG. 6 is a flowchart illustrating an embodiment of a process of managing one or more dynamic proxies and one or more associated document objects. In the example shown, an instance of an implementation object is created to represent and manage an item of content at 600. In some embodiments, the instance is a document object created using a base document implementation class, with type-based behaviors and/or one or more aspects attached. An implementation object can comprise a single object or multiple objects, such as a document object and multiple intermediary objects (e.g., content objects) where each intermediary object is used to manage a subset of content items associated with a document. At 602, a dynamic proxy that exposes an interface of an implementation object is created and linked to the implementation object.

In some embodiments, the dynamic proxy is extracted from, refers to, or is otherwise based on one or more interfaces associated with the implementation classes used at 600. In some embodiments, one or more dynamic proxies are associated with one or more document objects and appropriate links are formed.

It is decided at 604 whether there is an implementation object change. In some cases, an update indication is used to signal an implementation object change. An addition, deletion or other modification to the set of behaviors or attributes associated with an implementation object can be initiated by a process or user, and an update indication can be implicitly or explicitly triggered. In some cases, an update is associated with the assignment or detachment of an aspect.

If there is no implementation object change, the process remains at 604. Otherwise, at 606 a prior implementation object is replaced with a new implementation object. A new dynamic proxy that exposes any new interface is created and linked to the new implementation object at 608. In some embodiments, interfaces exposed by a prior and a new implementation object are evaluated to determine if there is a difference. If there is a difference, a new dynamic proxy is created at 608. Otherwise, step 608 is skipped. At 610, any pre-existing dynamic proxy still in use is linked to a new implementation object.

It is decided at 612 if the process of FIG. 6 is done. For example, this may occur if a document and its associated item(s) of content are deleted. Otherwise, it is decided at 604 whether there is an implementation object change.

Figure 7:
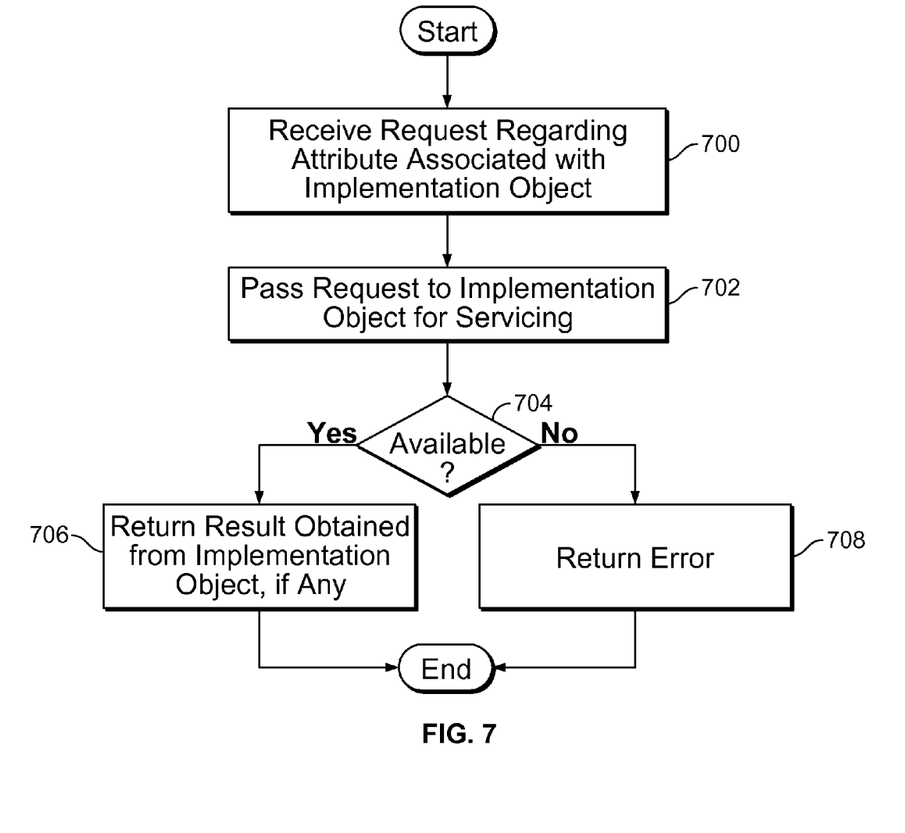
FIG. 7 is a flowchart illustrating an embodiment of a proxy process.

FIG. 7 is a flowchart illustrating an embodiment of a proxy process. In the example shown, a document object is occasionally updated, with or without a user's knowledge. Since an update can occur without a user's knowledge, some requests or calls by a user are conflicting, obsolete, or otherwise unavailable with respect to the current set of methods, behaviors, or attributes available to manage an item of content. At 700, a request is received regarding an attribute associated with implementation object. The request may be a call, invocation or other requested action associated with accessing or otherwise modifying one or more items of content.

The request is passed to an implementation object for servicing at 702. In some embodiments, a check or other process is performed on a request or call before it (if at all) is passed to a document object. At 704, availability is determined. A dynamic proxy that is retained for a sufficiently long time may have some portion of its interface that is out of date with respect to the current document object. A user or process could potentially attempt to access a service, behavior or other attribute advertised as being available or supported, but which in actuality is no longer available or supported.

If it is unavailable, an error is returned at 708. A variety of errors or exceptions can be returned. In some embodiments, the error returned is obtained from the document object and returned to the requesting entity. In some embodiments, an invocation handler is used and the handler generates the exception. In response to an error, a user or process can perform a "re-fetch" call or invocation to obtain the most recent dynamic proxy. The most recent proxy reflects the current interfaces supported regarding access to and/or manipulation of one or more content items. If it is available, a result obtained from an implementation object, if any, is returned at 706.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of updating an implementation object including:
   creating a first proxy to provide access to a first implementation object, wherein the first implementation object includes a first set of properties or actions for managing, including by accessing or manipulating, an item of content included in a collection of managed content;
   linking the first proxy to the first implementation object, wherein the first proxy exposes an interface of the first implementation object;
   using a processor to replace the first implementation object with a second implementation object that includes a second set of properties or actions for managing, including by accessing or manipulating, the same item of content in the collection of managed content that the first implementation object managed;
   using the processor to link the first proxy to the second implementation object so that after the change the first proxy provides access to the second implementation object instead of the first implementation object;
   determining whether the interface of the first implementation object is different from an interface of the second implementation object;
   in the event the interface of the first implementation object is different from the interface of the second implementation object, creating a second proxy to provide access to the second implementation object and linking the second proxy to the second implementation object, wherein the second proxy reflects the interface of the second implementation object;
   in the event the interface of the first implementation object is the same as the interface of the second implementation object, not creating the second proxy; and
   wherein an attribute regarding management of the item of content is associated with the first implementation object and is not associated with the second implementation object; and wherein an error is returned in response to a request associated with the attribute after the first implementation object is replaced with the second implementation object.

2. A method as recited in claim 1, wherein the first proxy is able to be retained by a user during a period that includes replacement of the first implementation object with the second implementation object.

3. A method as recited in claim 1, wherein:
   the collection of managed content includes contents of a document; and
   the first implementation object and the second implementation object both include one or more interfaces and one or more corresponding implementation classes having a hierarchy where behaviors or attributes are inherited based at least in part on the hierarchy.

4. A method as recited in claim 1 further comprising in response to receiving a request to access the second implementation object directly without going through the first proxy or the second proxy, returning an error.

5. A system for updating an implementation object including:
   a processor; and
   a memory coupled with the processor, wherein the memory is configured to provide the processor with instructions which when executed cause the processor to:
   create a first proxy to provide access to a first implementation object, wherein the first implementation object includes a first set of properties or actions for managing, including by accessing or manipulating, an item of content included in a collection of managed content;

link the first proxy to the first implementation object, wherein the first proxy exposes an interface of the first implementation object;

replace the first implementation object with a second implementation object that includes a second set of properties or actions for managing, including by accessing or manipulating, the same item of content in the collection of managed content that the first implementation object managed;

link the first proxy to the second implementation object so that after the change the first proxy provides access to the second implementation object instead of the first implementation object;

determine whether the interface of the first implementation object is different from an interface of the second implementation object;

in the event the interface of the first implementation object is different from the interface of the second implementation object, return a second proxy in response to a fetch request received after the first implementation object is replaced with the second implementation object, wherein the second proxy properly reflects the interface of the second implementation object;

in the event the interface of the first implementation object is the same as the interface of the second implementation object, not return the second proxy; and wherein an attribute regarding management of the item of content is associated with the first implementation object and is not associated with the second implementation object; and wherein an error is returned in response to a request associated with the attribute after the first implementation object is replaced with the second implementation object.

6. A system as recited in claim 5, wherein the first proxy is able to be retained by a user during a period that includes replacement of the first implementation object with the second implementation object.

7. A system as recited in claim 5, wherein:
the collection of managed content includes contents of a document; and
the first implementation object and the second implementation object both include one or more interfaces and one or more corresponding implementation classes having a hierarchy where behaviors or attributes are inherited based at least in part on the hierarchy.

8. A system as recited in claim 5, wherein the memory is further configured to provide the processor with instructions which cause the processor to: in response to receiving a request to access the second implementation object directly without going through the first proxy or the second proxy, return an error.

9. A computer program product for updating an implementation object, the computer program product being embodied in a non-transitory computer readable storage medium and comprising computer instructions for:

creating a first proxy to provide access to a first implementation object, wherein the first implementation object includes a first set of properties or actions for managing, including by accessing or manipulating, an item of content included in a collection of managed content;

linking the first proxy to the first implementation object, wherein the first proxy exposes an interface of the first implementation object;

replacing the first implementation object with a second implementation object that includes a second set of properties or actions for managing, including by accessing or manipulating, the same item of content in the collection of managed content that the first implementation object managed;

linking the first proxy to the second implementation object so that after the change the first proxy provides access to the second implementation object instead of the first implementation object;

determining whether the interface of the first implementation object is different from an interface of the second implementation object;

in the event the interface of the first implementation object is different from the interface of the second implementation object, returning a second proxy in response to a fetch request received after the first implementation object is replaced with the second implementation object, wherein the second proxy properly reflects the interface of the second implementation object;

in the event the interface of the first implementation object is the same as the interface of the second implementation object, not creating the second proxy; and wherein an attribute regarding management of the item of content is associated with the first implementation object and is not associated with the second implementation object; and wherein an error is returned in response to a request associated with the attribute after the first implementation object is replaced with the second implementation object.

10. A computer program product as recited in claim 9, wherein the first proxy is able to be retained by a user during a period that includes replacement of the first implementation object with the second implementation object.

11. A computer program product as recited in claim 9, wherein:
the collection of managed content includes contents of a document; and
the first implementation object and the second implementation object both include one or more interfaces and one or more corresponding implementation classes having a hierarchy where behaviors or attributes are inherited based at least in part on the hierarchy.

12. A computer program product as recited in claim 9 further comprising computer instructions for: in response to receiving a request to access the second implementation object directly without going through the first proxy or the second proxy, returning an error.

* * * * *